US007015930B2

(12) United States Patent
Gruber

(10) Patent No.: US 7,015,930 B2
(45) Date of Patent: Mar. 21, 2006

(54) METHOD AND APPARATUS FOR INTERPOLATING PIXEL PARAMETERS BASED ON A PLURALITY OF VERTEX VALUES

(75) Inventor: Andrew Gruber, Arlington, MA (US)

(73) Assignee: ATI Technologies Inc., Markham (CA)

( * ) Notice: Subject to any disclaimer, the term of this patent is extended or adjusted under 35 U.S.C. 154(b) by 70 days.

(21) Appl. No.: 10/633,214

(22) Filed: Aug. 1, 2003

(65) Prior Publication Data

US 2005/0024385 A1 Feb. 3, 2005

(51) Int. Cl.
*G06F 17/00* (2006.01)
*G09G 5/00* (2006.01)

(52) U.S. Cl. .................. 345/606; 345/418; 345/586; 345/501; 382/300

(58) Field of Classification Search ........ 345/418–422, 345/427–428, 586, 606–612, 501, 545, 550; 382/300
See application file for complete search history.

(56) References Cited

U.S. PATENT DOCUMENTS

| 5,347,618 A | * | 9/1994 | Akeley | 345/421 |
| 5,701,405 A | * | 12/1997 | Kelley et al. | 345/441 |
| 5,706,415 A | * | 1/1998 | Kelley et al. | 345/426 |
| 2003/0137514 A1 | * | 7/2003 | Nelson | 345/441 |

\* cited by examiner

*Primary Examiner*—Matthew C. Bella
*Assistant Examiner*—Wesner Sajous
(74) *Attorney, Agent, or Firm*—Vedder, Price, Kaufman & Kammholz, P.C.

(57) ABSTRACT

A method and apparatus for interpolating pixel parameters based on the plurality of vertex values includes operating first and a setup mode and a calculation mode. The method and apparatus includes, while in a setup mode, generating a plurality of differential geometric values based on the plurality of vertex values, wherein the differential geometric values are independent of a parameter slope between the plurality of vertex values. While in a calculation mode, a first geometric value and second geometric value are determined based on a pixel value, a plurality of vertex values and the differential geometric values. A pixel value is determined for each of the plurality of pixels based on the vertex parameter value, the first geometric value and the second geometric value. Thereupon, pixel parameters may be interpolated on a per-pixel basis reusing the differential geometric values.

27 Claims, 4 Drawing Sheets

METHOD AND APPARATUS FOR INTERPOLATING PIXEL PARAMETERS BASED ON A PLURALITY OF VERTEX VALUES

FIELD OF THE INVENTION

The present invention relates generally to graphics processing and more specifically to parameter interpolation in a three-dimensional graphics processing system.

BACKGROUND OF THE INVENTION

In a typical graphics processing system, one common graphics processing technique is the generation of images through the composition of a plurality of vertices. The plurality of vertices define a specific region containing a plurality of pixels therein. In common hardware implementations, interpolation of a pixel parameter is based on slopes of the value of the parameters at the vertices, for example, the value of a material color or texture at each of the three vertices for a triangle. Typically, the values are assumed to be planar wherein the three points of the triangle, vertices, provide all the requisite information for defining any parameter value over the entire x,y plane.

Typically, this interpolation process is implemented in two steps. The first step, a setup mode, is a once per triangle step of providing the slope of the parameter relative to x and y coordinates of a display screen. The slope may be denoted as a change in the parameter value divided by a change in an x plane and a change in the parameter value divided by a difference in the y plane. Furthermore, for each pixel within the triangle, the value at that point is calculated using these two slopes. The starting vertex is denoted as $P_0$ and is assumed to be located at $(x_0, y_0)$. For illustration purposes only, the other two vertices are denoted as P1, located at $(x_1, y_1)$, and P2 is located at $(x_2, y_2)$. Therefore, using equation 1, a parameter value for a particular location may be determined.

$$P(x,y) = P0 + (x-x_0)*dP/dx + (y-y_0)*dP/dy \qquad \text{Equation \#1}$$

A problem occurs in a typical processing system because of processing requirements to maintain an adequate level of precision. In a typical processing system, it is possible for the slopes in the dx and dy direction to have very large magnitudes, but opposite signs. The two slopes may largely cancel each other out, thereby leaving a reasonable value only if enough precision is used for the slope terms. For example, if a four bit sub-pixel precision is used in a screen having a 2K×2K bit precision, the parameter whose range within the triangle is limited to (0,0.1) may have a slope as much as 16 providing for the range of parameters across a screen to be as high as 32,768. Therefore, to accurately represent such a parameter to 24 bits of precision below the decimal point, the slope must be represented to a precision of 39 bits. Such precision is very costly to calculate in a setup engine, as well as costly to use for per-pixel interpolation. Not only are there transactional costs in terms processing cycles for computing values at the desired precision level, but there also exists costs in processing speed for determining these parameters.

Processing costs exists for parameter calculations across both the setup mode and a calculation mode of operation. There exists a need for a pixel processing method and apparatus to allow for parameter interpolation wherein the calculation of terms within the setup mode and calculations during the calculation mode provide improved precision and efficiency through a reduction in overall calculations.

DETAILED DESCRIPTION OF A PREFERRED EMBODIMENT

Generally, a method and apparatus for interpolating pixel parameters based on a plurality of vertex values includes operating first in a setup mode and then in a calculation mode. The method and apparatus includes, while in a setup mode, generating a plurality of differential geometric values based on the plurality of vertex values, wherein the differential geometric values are independent of a parameter slope between the pluralities of vertex values. The typical vertex value includes a general value having a (x, y) coordinate value and a differential geometric value, which is a value computed based on a difference of specific vertex values.

The method and apparatus further includes, while in a calculation mode, determining a first geometric value and a second geometric value based on a pixel value, which is specifically a coordinate location of the pixel, the plurality of vertex values and the differential geometric values. The first geometric value and second geometric value are values calculated based on combination of mathematical manipulation of various pixel values and differential geometric values. Furthermore, an interpolated pixel parameter value is determined for each of the plurality of pixels based on a vertex parameter value, the first geometric value and the second geometric value. In a preferred embodiment, the first geometric value, second geometric value and the pixel value are determined for each of the plurality of pixels, on a pixel by pixel basis.

In one embodiment, the plurality of differential geometric values may be stored in a temporary buffer during the setup mode and read from the temporary buffer during the calculation mode. The temporary buffer may be any type of memory device, but not limited to, single memory, plurality of memory locations, shared memory, CD, DVD, ROM, RAM, EEPROM, optical storage or any other non-volatile storage medium capable of storing differential geometric values therein.

Figure 1:
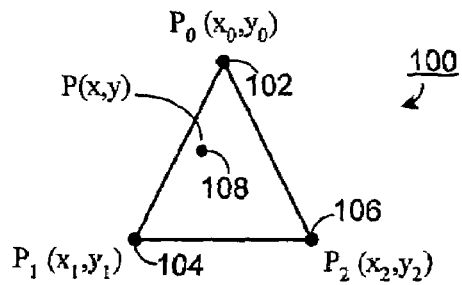
FIG. 1 illustrates a graphical representation of a graphical triangle having a plurality of vertices and are a plurality of pixel parameters.

More specifically, FIG. 1 illustrates a graphical representation of a triangle 100 having three (3) vertices 102, 104 and 106. Each of the vertices 102, 104 and 106 includes a first_plane value (x) and a second_plane value (y). More specifically, the zero_vertex parameter 102 includes the first_plane zero_vertex parameter (x0) and second_plane zero_vertex parameter (y0). The parameter 104 includes the first_plane first_vertex parameter (x1) and the second_plane first_vertex parameter (y1). The second_vertex parameter 106 includes a first_plane second_vertex parameter (x2) and a second_plane second_vertex parameter (y2).

When the vertices 102, 104 and 106 define a triangle, a pixel parameter 108 may be calculated based on the interpolation of the various vertex parameters, as discussed below.

Figure 2:
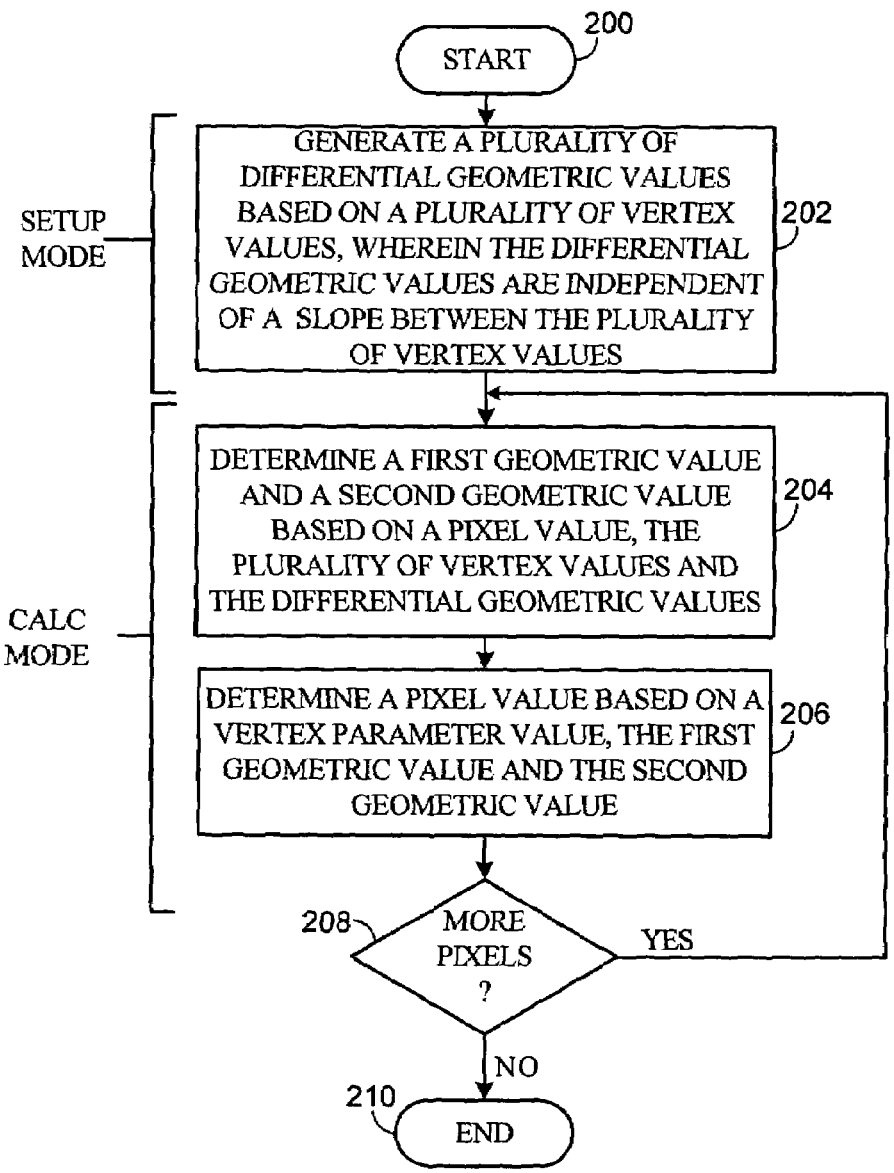
FIG. 2 illustrates a flowchart of a method for interpolating pixel parameters based on a plurality of vertex values in accordance with one embodiment of the present invention.

FIG. 2 illustrates a flowchart representing the steps of a method for interpolating the pixel parameters 108 based on the plurality of vertex values 102, 104 and 106. The method begins, step 200, by operating first within a setup mode. The first step, step 202, while in the setup mode, is generating a plurality of differential geometric values based on a plurality of vertex values, wherein the differential geometric values are independent of a parameter slope between the plurality of vertex values. The differential geometric values are differences between specific plane vertex values. In one embodiment, the plurality of differential geometric values may be calculated based on the following equations:

$$dx02 = x0 - x2 \qquad \text{Equation \#2}$$

$$dy02 = y0 - y2 \qquad \text{Equation \#3}$$

$$dx10 = x1 - x0 \qquad \text{Equation \#4}$$

$$dy10 = y1 - y0 \qquad \text{Equation \#5}$$

In one embodiment, the first differential geometric value dx02 is calculated based an the difference between the first_plane zero_vertex parameter x0 and the first_plane second_vertex parameter x2. The second differential geometric value dy02 is calculated based on the difference between the second_plane zero_vertex parameter y0 and the second_plane second_vertex parameter y2. The third differential geometric value dx10 is calculated based on the difference between the first_plane first_vertex parameter x1 and the first_plane zero_vertex parameter x0. And the fourth differential geometric value dy10 is calculated based on the difference between the second_plane first_vertex parameter y1 and the seconds_plane zero_vertex parameter y0.

In one embodiment of the present invention, the method next operates in a calculation mode wherein the next step, step 204, is determining a first geometric value and a second geometric value based on a pixel value (e.g., a coordinate location value (x,y)), the plurality of vertex values and the differential geometric values. In one embodiment, the first geometric value may be calculated by equation 6 and the second geometric value may be calculated by equation 7.

$$\text{geom\_1} = (x - x0) * dy02 + (y - y0) * dx02 \qquad \text{Equation \#6}$$

$$\text{geom\_2} = (x - x0) * dy10 + (y - y0) * dx10 \qquad \text{Equation \#7}$$

In this embodiment, the first geometric value geom. 1 is calculated by the difference of the first_plane pixel location value (x) and the first_plane zero_vertex parameter or value (x0) times the second differential geometric value dy02 added to the difference between the second_plane pixel location value (y) and second_plane zero_vertex parameter or value (y0) times the first differential geometric value dx02. Furthermore, in this embodiment, the second geometric value geom. 2 is calculated based on the multiplication of the difference between the first_plane pixel location value (x) and the first_plane zero_pixel parameter or value (x0) and the fourth differential geometric value dy10 summed with the multiplication of the difference between the second_plane pixel location value (y) and the second_plane zero_vertex parameter or value (y0) and the third differential geometric value dx10.

Furthermore, while on the calculation mode, the next step, step 206, is determining a pixel value based on a vertex parameter value, the first geometric value and the second geometric value. The interpolated pixel parameter value P(x,y), in one embodiment, may be calculated based on the following equation:

$$P(x,y) = P0 + P\text{dif}1 * \text{geom\_1} + P\text{dif}2 * \text{geom\_2} \qquad \text{Equation \#8}$$

The pixel value is the combination of the vertex parameter (P0), the first geometric value (geom_1) multiplied by a first parameter difference value (Pdif1) and the product of the second geometric value (geom_2) and a second differential parameter value (Pdif2). As discussed in greater detail below, the pixel values calculated by equation 8 include terms, Pdif1 and Pdif2, which are set-up mode terms. These set-up mode terms are calculated during the set-up mode and may be used to verify the value of the interpolated pixel parameter value P(x,y), as discussed below utilizing, in one embodiment, equations 9–11.

As indicated in FIG. 2, steps 204 and 206 are performed while operating in a calculation mode and are performed on a pixel-by-pixel basis, as illustrated by the determinative step 208. In the event there are more pixels for pixel parameters to be calculated, steps 204 and 206 are repeated for each value until all of the pixel parameters are calculated. Thereupon, the method is complete, step 210.

The method of FIG. 2 improves over prior interpolating pixel parameter techniques by, during the calculation mode, utilizing terms calculated during the setup mode, wherein calculation mode calculations provide for fewer computations and improved precision, thereby improving the processing speed and reducing overhead processing requirements. More specifically, the differential geometric values are calculated in the setup mode and may be reused for each pixel parameter calculation which is done on a pixel-by-pixel basis during the calculation mode. Furthermore, based on calculating Equations 2–5 in setup mode, an optimized level of precision may be obtained without requiring excess computational overhead during the calculations of the calculation mode, as discussed below.

As recognized by one having ordinary skill in the art, the plurality of differential geometric values and the geometric values may be calculated using any variant combination to produce equivalent results. Regardless thereof, in accordance with one embodiment of the present invention, the geometric differential values may be calculated during the setup mode and the geometric values calculated during the calculation mode on a per pixel basis using differential geometric values.

Figure 3:
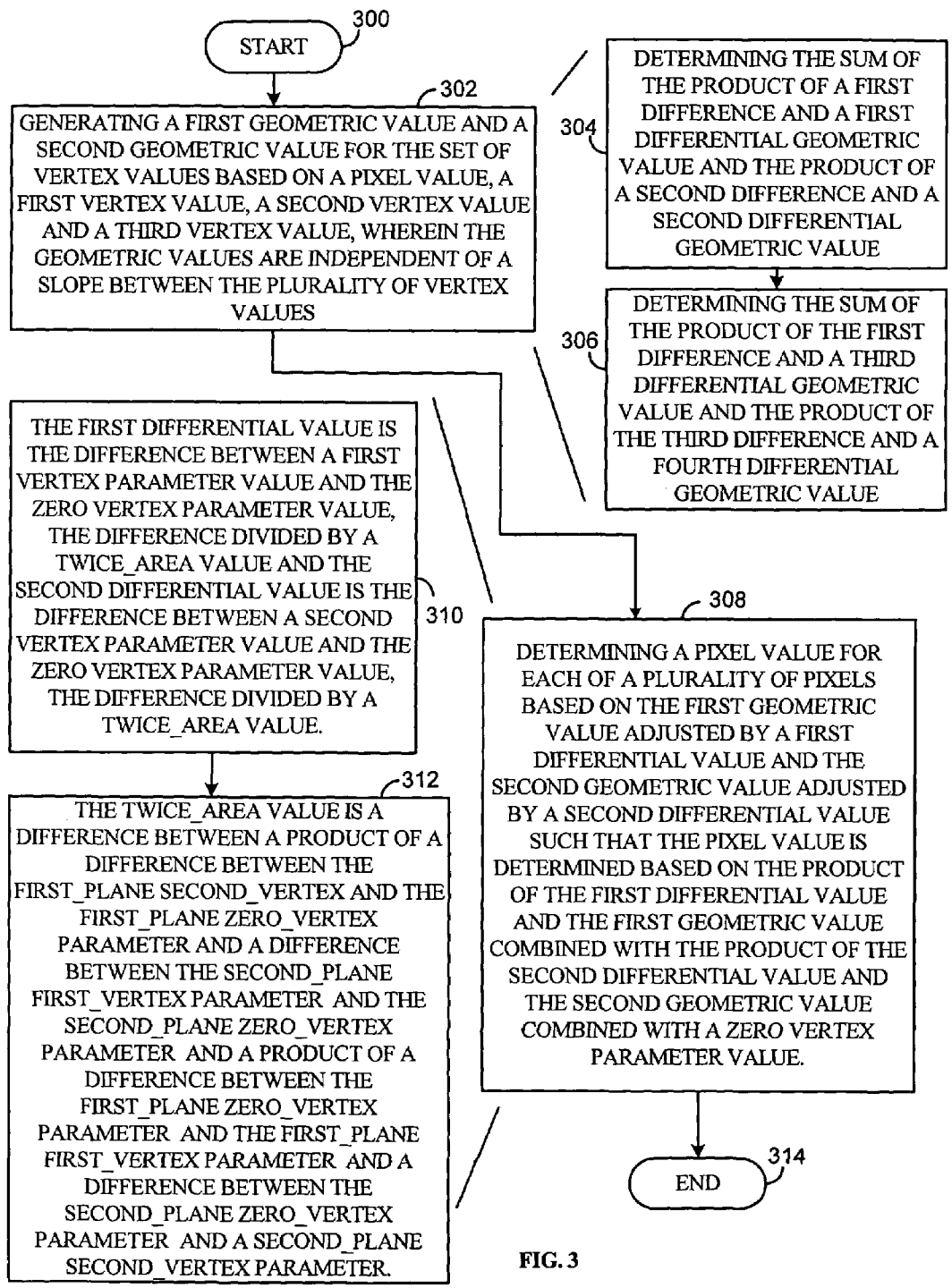
FIG. 3 illustrates a flowchart of a calculation mode of one embodiment of a method for interpolating pixel parameters based on the plurality of vertex values.

FIG. 3 illustrates another embodiment of the calculation mode operation of the method for interpolating pixel parameters based on a plurality of vertex values, wherein a plurality of the terms utilized in the calculation mode are pre-calculated during the set-up mode, as noted below. The method begins, step 300, by generating a first geometric value and a second geometric value for the set of vertex values based on a pixel value, a first vertex value, a second vertex value and a third vertex value, wherein the geometric values are independent of a slope between the plurality of vertex values, step 302. Similar to the embodiment described above, the first geometric value may be calculated using equation 6 and the second geometric value may be calculating using equation 7.

In a further embodiment, step 302 consists of steps 304 and 306, wherein step 304 includes determining the sum of the product of a first difference and a first differential geometric value and the product of a second difference and a second differential value and step 306 includes determining the sum of the product of the first difference and a third differential value and the product of a third difference and the fourth differential geometric value. In this embodiment, the first difference is the difference between the first_pixel parameter (x) and the first_plane zero_vertex parameter (x0). In one embodiment, the first differential geometric value is the value calculated using equation 2. The second difference is the difference between the second_plane pixel value (y) and the second_plane zero_vertex parameter (y0). Furthermore, in one embodiment, the second differential geometric value is the value calculated by equation 3. In one embodiment, the third differential geometric value is the value calculated by equation 5 and the fourth differential value is the value calculated by equation 4.

Upon the generation of the first geometric value and the second geometric value, the next step, step 308, is determining a pixel value for each of the plurality of pixels based on the first geometric value adjusted by a first differential value and the second geometric value adjusted by a second geometric value such that the pixel value is determined based on a product of the first differential value and the first geometric value combined with the product of the second differential value and the second geometric value combined with a zero vertex parameter value.

As discussed above, step 308 is illustrated the equation 8. Step 308 further includes steps 310 and 312. Step 310 includes the first differential value being the difference between a first vertex parameter value and a zero vertex parameter value, the difference divided by a twice_area value and the second differential value is the difference between a second vertex parameter value and the zero vertex parameter value, the difference divided by a twice_area value. In one embodiment, the first differential value and second differential value are calculated during the set-up mode using the following equations:

$$Pdif1 = (P1-P0)/\text{twice\_area} \qquad \text{Equation \#9}$$

$$Pdif2 = (P2-P0)/\text{twice\_area} \qquad \text{Equation \#10}$$

Step 312 includes the twice_area value as being a difference between a product of a difference between the first_plane second_vertex parameter and a first_plane zero_vertex parameter and a difference between the second_plane first_vertex parameter and the second_plane zero vertex parameter and a product of a difference between the first_plane zero_vertex parameter and the first_plane first_vertex parameter and a difference between the second_plane zero_vertex parameter and a second_plane second_vertex parameter. As discussed above with regards to equations 8–10, the Pdif terms are terms calculated during the set-up mode, therefore the twice_area term of equation 11 is also calculated during the set-up mode. Stated as an equation, step 312 may be quantified, in one embodiment, as equation 11:

$$\text{twice\_area} = (x2-x0)(y1-y0) - (x0-x1)(y0-y2) \qquad \text{Equation \#11}$$

Thereupon, upon the completion of step 308, while in a calculation mode, the method is complete, step 314. As discussed above, steps 302 and 308 may be repeated on a per-pixel basis utilizing the plurality of differential geometric values repeatedly for each pixel, thereby reducing system processing overhead. Through the utilization of values computed during the set-up mode, the calculation mode efficiently generates the intended values. Furthermore, through generating the values noted in equations 9–11, the calculated value of equation 8 may be verified to insure that the proper pixel value P(x,y) is calculated using the values of equations 9–11.

Figure 4:
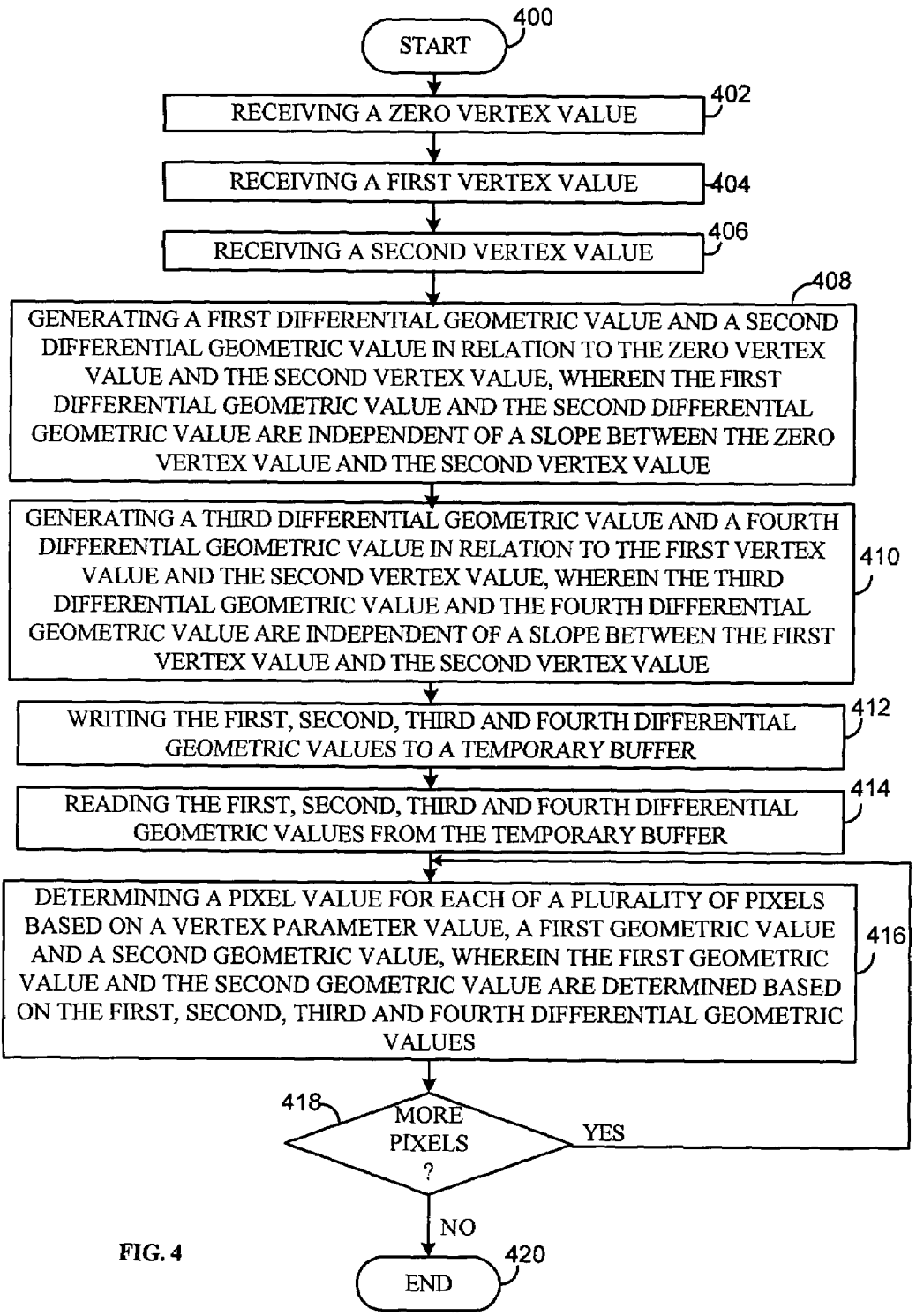
FIG. 4 illustrates a flowchart of an alternative method for interpolating pixel parameters based on the plurality of vertex values.

FIG. 4 illustrates an alternative embodiment of a method for interpolating pixel parameters. The method begins, step 400, by receiving a zero vertex value, step 402. In one embodiment, zero vertex value may be the value P0(x0, y0). The next step, step 404, is receiving a first vertex value, such as P1(x1, y1). The next step, step 406, is receiving a second vertex value, such as P2(x2, y2).

Upon receiving the zero vertex value, the first vertex value and the second vertex value, the next step, step 408, is generating a first differential geometric value and a second differential geometric value in relation to the zero vertex value and the second vertex value. Moreover, the first differential geometric value and the second differential geometric value are both independent of a parameter slope between the zero vertex value and the second vertex value. As discussed above, the first differential geometric value is similar to the value generated by equation 2 and the second differential geometric value is the value created by equation 3.

The next step, step 410, is generating a third differential geometric value and a fourth differential geometric value in relation to the first vertex value and the second vertex value. Once again, the third differential geometric value and the fourth differential geometric value are both independent of a parameter slope between the first vertex value and the second vertex value. As discussed above, the third differential geometric value, in one embodiment, is the value generated by equation 4 and the fourth differential geometric value is the value generated by equation 5.

Thereupon, the first, second, third and fourth differential geometric values are written to a temporary buffer, step 412. In one embodiment, steps 402–412 are performed during a setup mode of operation.

Whereupon, during a calculation mode of operation, the first, second, third and fourth differential geometric values are read from the temporary buffer, step 414. Thereupon, on a pixel-by-pixel basis, a pixel value may be determined for each of a plurality of pixels based on a vertex parameter value, a first geometric value and a second geometric value, wherein the first geometric value and the second geometric value are determined based on the first, second, third and fourth differential geometric values, step 416. As discussed above, the first geometric value, in one embodiment, is represented by equation 6 and the second geometric value, in one embodiment, is generated by equation 7.

Next, step 418, a determination is made as to whether there are more pixels. In the event there are more pixels, step 416 is repeated for each of the pixels of the plurality of pixels. In the event no more pixels are to have parameters interpolated therein, the method is complete, step 420.

Figure 5:
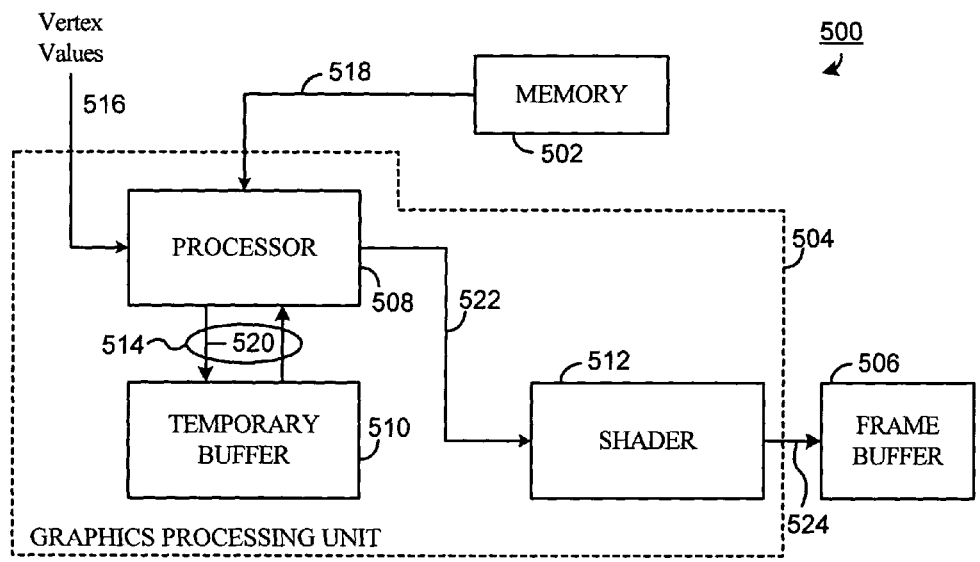
FIG. 5 illustrates an apparatus for interpolating pixel parameters based on the plurality of vertex values, in accordance with one embodiment of the present invention.

FIG. 5 illustrates an apparatus 500 for interpolating pixel parameters based on a plurality of vertex values, in accordance with one embodiment to the present invention. The apparatus 500 includes a memory 502 coupled to a graphics processing unit 504, wherein the graphics processing unit 504 is coupled to a frame buffer 506. The memory 502 may be, but not limited to, a single memory, a plurality of memory locations, shared memory, CD, DVD, ROM, RAM, EEPROM, optical storage, or any other non-volatile storage medium capable of storing digital data thereon. The graphics processing unit 504 further includes a processor 508 coupled to a temporary buffer 510 and a shader 512.

The processor 508 may be, but not limited to, a single processor, plurality of processors, a DSP, microprocessor, an ASIC, a state machine, or any other implementation capable of processing and executing software or discrete logic or any other suitable combination of hardware, software and/or firmware. The term processor should not be construed to refer exclusively to hardware capable of executing software, and may implicitly include DSP hardware, ROM for storing software, RAM, and any other volatile or non-volatile storage medium. The shader 512 may be a typical graphics shader operating in accordance with known graphics shading techniques to provide shading for a plurality of pixels. Furthermore, as recognized by one having ordinary skills in the art, the temporary buffer 510 may be any type of suitable memory, such as described above with respect to the memory 502.

The processor 508 is coupled to the temporary buffer 510 across a bus 514 for writing and reading temporarily stored information to and from the temporary buffer 510. In one embodiment, the processor 508 receives a plurality of vertex values 516. In one embodiment, the vertex values represent values P0(x0,y0), P1 (x1,y1) and P2(x2,y2). The processor 508 also receives executable instructions 518 from the memory 502 for performing operations therein. The processor 508, in response to the executable instructions 518, operates in one of two different modes, a setup mode and a calculation mode. As discussed above with regard to FIGS. 2–4, while on a setup mode, a plurality of geometric differential values are calculated based on the vertex values and stored in the temporary buffer 510. Whereupon, during a calculation mode, the differential geometric values 520 are read from the temporary buffer 510, across bus 514, such that the processor may perform pixel parameter interpolation on a pixel-by-pixel basis using the differential geometric values.

Upon generating the interpolated pixel parameters, the processor 508 provides pixel information 522 to the shader 512, in accordance with known shading operations. The shader 512 thereupon performs shading operations, writing a graphical output 524 to the frame buffer 506. Whereupon, the apparatus 500, through the operations of the processor 508 in response to the executable instructions 518 to the memory 502, provides for interpolating pixel parameters based on the plurality of vertex values 516 in the setup and calculation mode system, thereby improving processing speed, reducing overall system processing, and improving parameter precision overhead through the use of pre-generated geometric differential values 520 temporarily stored in the temporary buffer 510.

Figure 6:
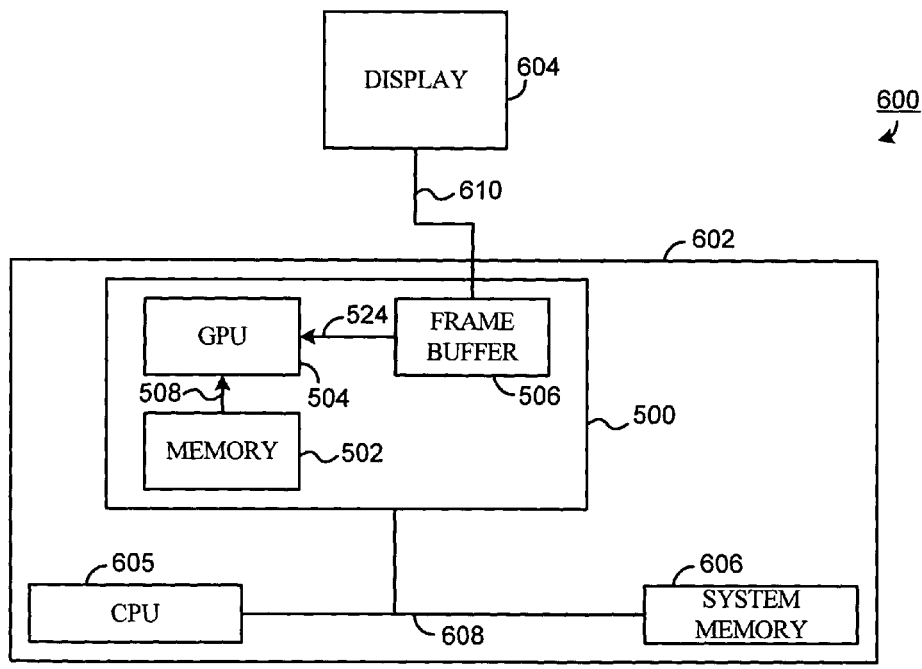
FIG. 6 illustrates computing system utilizing the graphics processing unit of FIG. 5, in accordance with one embodiment of the present invention.

FIG. 6 illustrates a visual display system 600 having a computer processing system 602 coupled to a display 604. The display 604 may be any suitable display, such as a computer monitor, LCD screen, a CRT screen, or any other visual output device as recognized by having ordinary skill in the art. The computer processing system 602 includes a CPU 605 operably coupled to system memory 606 via a main bus 608, which is further coupled to the graphics rendering engine 500. As recognized by one having ordinary skill in the art, many elements within the computer processing system 602 and the graphics rendering engine 500 have been omitted for clarity purposes only.

Similar to operations discussed above with regard to FIG. 5 and performing operations as discussed in FIGS. 2–4, in response to executable instructions 518 from the memory 502, the graphics processing unit 504 performs setup modes operations based on vertex values and calculation mode operations based on the plurality of differential geometric values stored in the temporary buffer 510. The graphics processing unit 504 generates the visual display output 524 provided to the frame buffer 506. In accordance with known frame buffer technology, once the frame buffer 506 includes a full screen, a display output 610 is provided to display 604 for visual display thereon.

The present invention improves over prior art parameter interpolation technique by reducing the amount of system processing required to interpolate specific pixel parameters. Among other benefits, through utilizing setup mode and calculation mode operation, overall system processing overhead is reduced through initial calculations of the differential geometric values (such as equations 2–5). By storing these differential geometric values in a temporary buffer, the specific differential geometric values may be reused on a per-pixel basis to generate geometric values (equations 6 and 7), which is further used to generate pixel parameters (equation 8).

The present invention further provides for limiting any loss of value precision in the calculated pixel value P(x,y) of equation 8. None of the terms of equation 8, for points within the triangle, exceed the range of the parameter vertex values. As recognized by one having ordinary skill in the art, multiplication and division operations are precision preserving operations, whereas precision may be lost during an addition operation having two large addends with opposite signs. As illustrated by exemplary equation:

$$P(x,y)=P0+(P1-P0)*i+(P2-P0)*j \qquad \text{Equation \#12}$$

Within equation 12, the value "i" is calculated by the division of geom._1 (equation 6) by twice_area (equation 11) and the value "j" is calculated by the division of geom._2 (equation 7) by twice_area (equation 11). As noted above, the values "i" and "j" must be less than 1 for all points within the triangle and because the value P(x,y) is an interpolation function, all values of P(x,y) fall within the range of values defined by the vertices.

If either "i" or "j" exceeds a value of 1, the P(x,y) value would exceed the range of the parameter values at the vertices as P(x,y) would be greater than P1, P2 or P3. This would therein violate the interpolation constraint. As such, because of this limitation on the range of (i,j), the range of each of addend terms of equation 8 are limited. Thereupon, this limits any loss of precision, allowing P(x,y) to be generated at a given precision without the need for greatly extended precision during intermediate calculations.

It should be understood that there exists implementations of other variations and modifications of the invention and its various aspects, as may be readily apparent to those of ordinary skill in the art, and that the invention is not limited by the specific embodiments described herein. For example, the parameter interpolation method and apparatus may further apply to barycentric coordinates or any other coordinate system, as recognized by one having ordinary skill in the art. It is therefore contemplated and covered by the present invention any and all modifications, variations, or equivalents that fall within the scope of the basic underlying principles disclosed and claimed herein.

What is claimed is:

1. A method for interpolating pixel parameter values based on a plurality of vertex values, the method comprising:

while in a setup mode in a system, generating a plurality of differential geometric values based on the plurality of vertex values, wherein the differential geometric values are independent of a parameter slope between the plurality of vertex values;

while in a calculation mode in a system, for each of a plurality of pixels:
determining a first geometric value and a second geometric value based on a pixel location value, the plurality of vertex values and the differential geometric values; and
determining an interpolated pixel parameter value for each of the plurality of pixels based on a vertex parameter value, the first geometric value and the second geometric value.

2. The method of claim 1 further comprising:
while in the setup mode, writing the plurality of differential geometric values to a temporary buffer; and
while in the calculation mode, reading the plurality of differential geometric values from the temporary buffer for the calculation of the interpolated pixel parameter value for each of the plurality of pixels.

3. The method of claim 1 wherein the interpolated pixel parameter value is further determined based on the first geometric value adjusted by a first differential value and the second geometric value adjusted by a second differential value.

4. The method of claim 3 wherein the plurality of vertex values includes a first vertex value, a second vertex value and a third vertex value.

5. The method of claim 4 wherein the step of determining the interpolated pixel parameter value further comprises:
combining the first vertex value, the first geometric value adjusted by the first differential value and the second geometric value adjusted by the second differential value.

6. The method of claim 4 wherein the plurality of differential geometric values includes a first differential geometric value and a second differential geometric value, the step of generating the first geometric value includes:
determining the sum of the product of a first difference and the first differential geometric value and the product of a second difference and the second differential geometric value, wherein:
the first difference is the difference between a first_plane pixel location value and a first_plane zero_vertex parameter;
the first differential geometric value is the difference between a second_plane zero_vertex parameter and a second_plane second_vertex parameter;
the second difference is the difference between the second_plane pixel location value and a second_plane zero_vertex parameter; and
the second differential geometric value is the difference between the first_plane zero_vertex parameter and a first_plane second_vertex parameter.

7. The method of claim 6 wherein the plurality of differential geometric values includes a third differential geometric value, the step of generating the second geometric value includes:
determining the sum of the product of the first difference and the third differential geometric value and the product of the third difference and the fourth differential geometric value, wherein:
the third differential geometric value is the difference between a second_plane first_vertex parameter and the second_plane zero_vertex parameter; and
the fourth differential geometric value is the difference between a first_plane first_vertex parameter and the first_plane zero_vertex parameter.

8. The method of claim 7 wherein the first differential value is the difference between a second vertex value and the first vertex value, the difference divided by a twice_area value and the second differential value is the difference between a third vertex value and the first vertex value, the difference divided by a twice_area value.

9. The method of claim 8 wherein the twice_area value is a difference between a product of a difference between the first_plane second_vertex parameter and the first_plane zero_vertex parameter and a difference between the second$_{13}$ plane first_vertex parameter and the second_plane zero_vertex parameter and a product of a difference between the first_plane zero_vertex parameter and the first_plane first_vertex parameter and a difference between the second_plane zero_vertex parameter and the second_plane second_vertex parameter.

10. An apparatus for interpolating pixel parameters based on a plurality of vertex values, the apparatus comprising:
a processor;
a temporary buffer operably coupled to the processor; and
a memory operably coupled to the processor, the memory storing a plurality of executable instructions such that the processor, in response to the executable instructions:
while in a setup mode, generates a plurality of differential geometric values based on the plurality of vertex values, wherein the differential geometric values are independent of a parameter slope between the plurality of vertex values;
while in a calculation mode, for each of a plurality of pixels:
determines a first geometric value and a second geometric value based on a pixel location value, the plurality of vertex values and the differential geometric values; and
determines an interpolated pixel parameter value for each of the plurality of pixels based on a vertex parameter value, the first geometric value and the second geometric value.

11. The apparatus of claim 10 wherein the processor, in response to the executable instructions:
while in the setup mode, writes the plurality of differential geometric values to a temporary buffer; and
while in the calculation mode, reads the plurality of differential geometric values from the temporary buffer for the calculation of the interpolated pixel parameter value for each of the plurality of pixels.

12. The apparatus of claim 10 wherein the processor, in response to the executable instructions, determines the interpolated pixel parameter value based on the first geometric value adjusted by a first differential value and the second geometric value adjusted by a second differential value.

13. The apparatus of claim 12 wherein the processor, in response to the executable instructions further includes determining the interpolated pixel parameter value by summing the vertex parameter value, the first geometric value adjusted by the first differential value and the second geometric value adjusted by the second differential value.

14. The apparatus of claim 12 wherein the processor, in response to the executable instructions determines the first differential value as the difference between a second vertex value and a first vertex value, the difference divided by a twice_area value and the second differential value is the difference between a third vertex value and the first vertex value, the difference divided by the twice_area value.

15. The apparatus of claim 14 wherein the twice_area value is a difference between a product of a difference between a first_plane second_vertex parameter and a first_plane zero_vertex parameter and a difference between a second_plane first_vertex parameter and a second_plane zero_vertex parameter and a product of a difference between a first_plane zero_vertex parameter and a first_plane first_vertex parameter and a difference between the second_plane zero_vertex parameter and a second_plane second_vertex parameter.

16. The apparatus of claim 10 wherein the processor, in response to the executable instructions:
generates the first geometric value by the sum of the product of a first difference and a first differential geometric value and the product of a second difference and a second differential geometric value, wherein:
the first difference is the difference between a first_plane pixel location value and first_plane zero_vertex parameter;
the first differential geometric value is the difference between a second_plane zero_vertex parameter and a second_plane second_vertex parameter;
the second difference is the difference between the second_plane pixel location value and a second_plane zero_vertex parameter; and
the second differential geometric value is the difference between the first_plane zero_vertex parameter and a first_plane second_vertex parameter; and
generates the second geometric value the sum of the product of the first difference and a third differential geometric value and the product of the third difference and a fourth differential geometric value, wherein:
the third differential geometric value is the difference between a second_plane first_vertex parameter and the second_plane zero_vertex parameter; and
the fourth differential geometric value is the difference between a first_plane first_vertex parameter and the first_plane zero_vertex parameter.

17. The apparatus of claim 10 further comprising:
a shader operably coupled to the processor such that the shader is capable of receiving the plurality of pixels and generates a plurality of display pixels; and
a frame buffer coupled to the shader such that the frame buffer receives the plurality of display pixels therefrom.

18. A method for interpolating pixel parameters based on a plurality of vertex values, the method comprising:
receiving a zero vertex value;
receiving a first vertex value;
receiving a second vertex value;
generating a first differential geometric value and a second differential geometric value in relation to the zero vertex value and the second vertex value, wherein the first differential geometric value and the second differential geometric value are independent of a parameter slope between the zero vertex value and the second vertex value;
generating a third differential geometric value and a fourth differential geometric value in relation to the first vertex value and the second vertex value, wherein the third differential geometric value and the fourth differential geometric value are independent of a parameter slope between the first vertex value and the second vertex value;
writing the first geometric value and the second geometric value to a temporary buffer.

19. The method of clam 18 wherein the zero vertex value includes a first_plane zero_vertex parameter and a second_plane zero_vertex parameter, the first vertex value includes a first_plane first_vertex parameter and a second_plane first_vertex parameter, and the second vertex value includes a first_plane second_vertex parameter and a second_plane second_vertex parameter.

20. The method of claim 18 further comprising:
reading the first differential geometric value and the second differential geometric value from the temporary buffer; and
on a pixel by pixel basis, determining a pixel value for each of a plurality of pixels based on a vertex parameter value, a first geometric value and a second geometric value, wherein the first geometric value and the second geometric value are determined based on the first differential geometric value, the second differential geometric value, the third differential geometric value and the fourth differential geometric value.

21. The method of claim 20 wherein the step of determining the pixel value further includes the pixel value based on a first differential value and a second differential value.

22. The method of claim 21 wherein the pixel value is determined based on the product of the first differential value and the first geometric value combined with the product of the second differential value and the second geometric value combined with the vertex parameter value.

23. A method for interpolating pixel parameter values based on a plurality of vertex values, the method comprising:
operating in a setup mode and while in a setup mode:
generating a plurality of differential geometric values for the plurality of vertex values based on a zero vertex value, a first vertex value and a second vertex value, wherein the plurality of differential geometric values are independent of a parameter slope between the plurality of vertex values;
writing the plurality of differential geometric values to a temporary buffer; and switching to a calculation mode and while in a calculation mode:
reading the plurality of differential geometric values from the temporary buffer; and
determining an interpolated pixel parameter value for each of a plurality of pixels based on a first geometric value adjusted by a first differential value and the second geometric value adjusted by a second differential value such that the interpolated pixel parameter value is determined based on the product of the first differential value and the first geometric value combined with the product of the second differential value and the second geometric value combined with the first vertex value, wherein the first geometric value and the second geometric value are determined with respect to the plurality of differential geometric values.

24. The method of claim 23 wherein the step of generating the first geometric value includes:
determining the sum of the product of a first difference and a first differential geometric value and the product of a second difference and a second differential geometric value, wherein:
the first difference is the difference between a first_plane pixel location value and a first_plane zero_vertex parameter;
the first differential geometric value is the difference between a second_plane zero_vertex parameter and a second_plane second_vertex parameter;
the second difference is the difference between a second_plane pixel location value and a second_plane zero_vertex parameter; and the second differential geometric value is the difference between the first_plane zero_vertex parameter and a first_plane second_vertex parameter; and determining the sum of the product of the first difference and a third differential geometric value and the product of the third difference and a fourth differential geometric value, wherein:

the third differential geometric value is the difference between a second_plane first_vertex parameter and the second_plane zero_vertex parameter; and the fourth differential geometric value is the difference between a first_plane first_vertex parameter and the first_plane zero_vertex parameter.

25. The method of claim 24 wherein the first differential value is the difference between a second vertex value and the first vertex value, the difference divided by a twice_area value and the second differential value is the difference between a third vertex value and the first vertex value, the difference divided by a twice_area value.

26. The method of claim 25 wherein the twice_area value is a difference between a product of a difference between the first_plane second_vertex parameter and the first_plane zero_vertex parameter and a difference between the second_plane first_vertex parameter and the second_plane zero_vertex parameter and a product of a difference between the first_plane zero_vertex parameter and the first_plane first_vertex parameter and a difference between the second_plane zero_vertex parameter and a second_plane second_vertex parameter.

27. The method of claim 1 wherein the system includes a processor.

* * * * *